US007269595B1

(12) United States Patent
Loboz et al.

(10) Patent No.: US 7,269,595 B1
(45) Date of Patent: Sep. 11, 2007

(54) REDUCING DATABASE REORGANIZATION TIME

(75) Inventors: Charles Zdzislaw Loboz, West Ryde (AU); Jonatan Kelu, Granville (AU); Rajan Sahu, Carlingford (AU)

(73) Assignee: Unisys Corporation, Blue Bell, PA (US)

( * ) Notice: Subject to any disclaimer, the term of this patent is extended or adjusted under 35 U.S.C. 154(b) by 610 days.

(21) Appl. No.: 10/392,241

(22) Filed: Mar. 19, 2003

(51) Int. Cl.
*G06F 17/00* (2006.01)

(52) U.S. Cl. .................. 707/102; 707/101; 707/103 R; 707/104.1

(58) Field of Classification Search .................... 707/1, 707/4, 100, 102, 103, 101, 200, 204, 8, 10, 707/103 R, 104.1, 3, 103 X
See application file for complete search history.

(56) References Cited

U.S. PATENT DOCUMENTS 5,721,915 A * 2/1998 Sockut et al. ............... 707/200
6,122,640 A * 9/2000 Pereira ................... 707/103 R
6,343,296 B1 * 1/2002 Lakhamraju et al. ... 707/103 R
6,363,387 B1 * 3/2002 Ponnekanti et al. .......... 707/10
6,442,543 B1 * 8/2002 Snodgrass et al. ............. 707/3
6,460,048 B1 * 10/2002 Teng et al. ............. 707/103 R
6,477,535 B1 * 11/2002 Mirzadeh ..................... 707/101
6,519,613 B1 * 2/2003 Friske et al. ................ 707/202
6,915,296 B2 * 7/2005 Parson .......................... 707/4
2001/0047360 A1 * 11/2001 Huras et al. ................ 707/102
2002/0065792 A1 * 5/2002 Bonner et al. ................. 707/1
2003/0056082 A1 * 3/2003 Maxfield ........................ 712/4
2003/0135478 A1 * 7/2003 Marshall et al. ............... 707/1
2004/0078398 A1 * 4/2004 Chiang et al. .............. 707/204
2004/0215632 A1 * 10/2004 Isip et al. .................... 707/100
2006/0212496 A1 * 9/2006 Romine et al. ............. 707/204

* cited by examiner

*Primary Examiner*—Thuy Pardo
(74) *Attorney, Agent, or Firm*—Alfred W. Kozak; Mark T. Starr; Richard J. Gregson

(57) ABSTRACT

The invention provides a system and method for reducing the amount of downtime during a database reorganization. The invention provides a method whereby data values are unloaded from a table in a database, stored in a substantially original format in another location within the database whilst the database is modified, and reloaded into the modified table.

8 Claims, 1 Drawing Sheet

REDUCING DATABASE REORGANIZATION TIME

FIELD OF THE INVENTION

Figure 1:
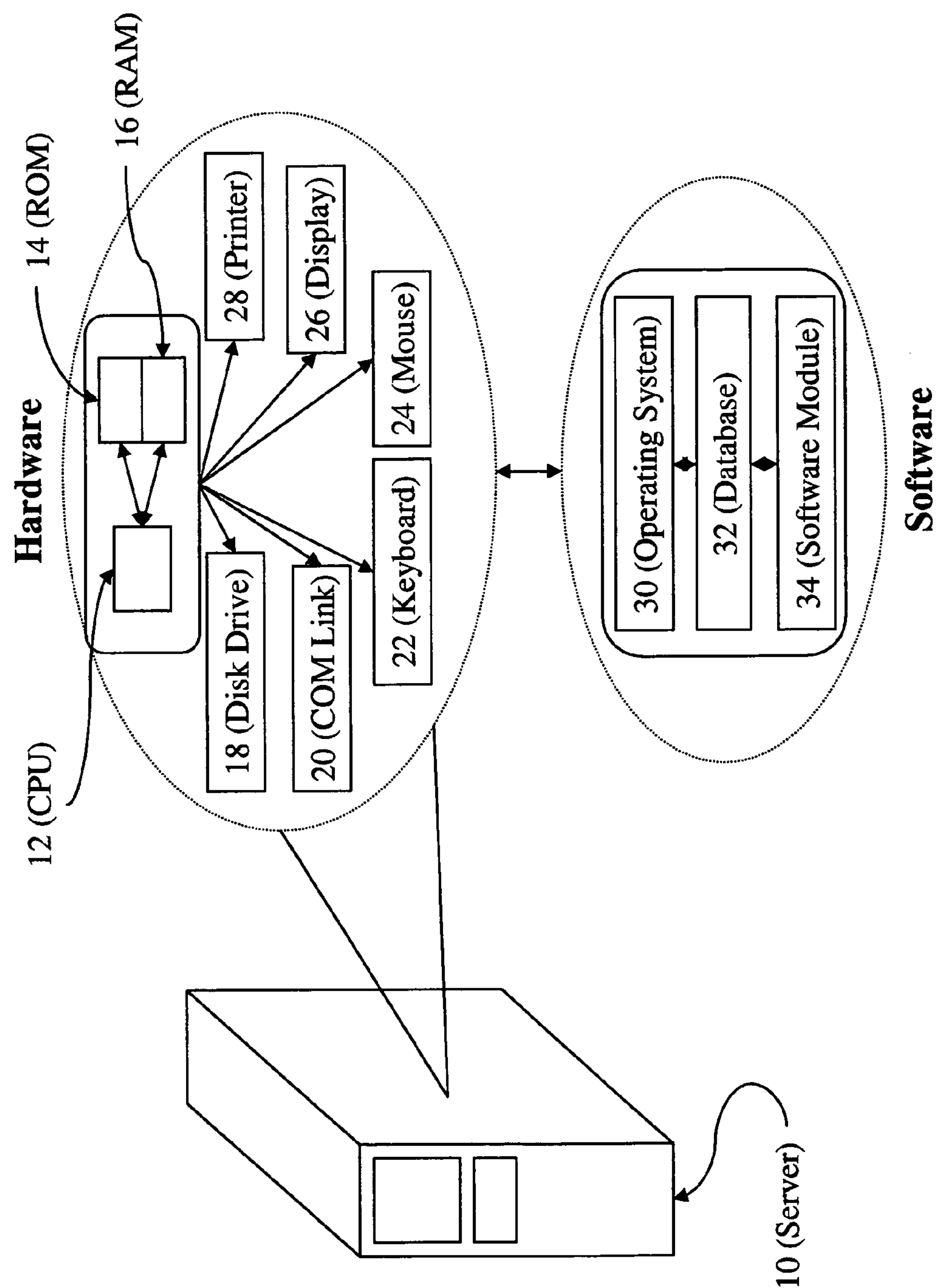

The present invention relates to a system and method for the reduction of total downtime during a database reorganization.

BACKGROUND OF THE INVENTION

Many large and small businesses operate computer based databases to track and record several aspects of their business. For example, it is quite common for a business to keep a computer based database which contains a record of their regular clients, with details such as the customers name, address, contact numbers (such as telephone and fax numbers), contact email address, etc.

As the business grows and evolves, or customer requirements change, the type of information recorded in the database may need to be modified to reflect this change. For example, a customer may move to a different address, or change their company name, or their contact details. Such changes may simply require the updating of data values within the database, and can usually be accomplished without any serious problems.

There are other complex situations, however, where a major reorganization of the database is required to ensure that the database remains relevant and useful for the business. For example, when a new form of communication is developed, this may result in the need for the provision of an extra field in the database to hold the new information. An example of such a development is email.

In another more complex example, a customer may decide that they require deliveries to two separate addresses, creating the requirement for an extra "address" field in the database.

In a final example, the type of data held in a data field or column may also change. For example, a data field that was previously only arranged to hold integer values may need to be modified to hold character values.

Such complex changes necessitate a change in the underlying structure of the database. For example, a database such as a relational database is comprised of a large number of tables, each table being divided into a number of columns, each column being divided up into a number of elements, each element being arranged to house a data value. Furthermore, each table in the database may be linked to other tables via devices such as pointers. That is, some elements in the table may not contain data values per se, but contain values that "point" or link one table to another table.

Therefore, when a table is to be modified, any data currently held in the table must be preserved to prevent accidental loss of the data. This is usually achieved by temporarily shutting down the database, unloading the data from the affected table(s), performing the required database modifications, and re-loading the data into the newly created database structure. To ensure that data integrity is maintained, it is necessary to prevent users from accessing the database during such modifications and reorganizations. This "downtime" should be preferably minimised, as many large companies cannot effectively function when their database is not accessible.

Therefore, as a general proposition, it is desirable to reduce the amount of time required to effect a database reorganization.

SUMMARY OF THE INVENTION

In a first aspect, the present invention provides a method of modifying a database, comprising the steps of, unloading data values from at least a portion of a table in a database, storing the unloaded data values in a substantially original format in another location in the database;

modifying the at least one portion of the table, and reloading at least a portion of the stored data values to the at least one modified portion of the table.

An advantage of the present invention is that it reduces the amount of "downtime" necessary to effect a database reorganization. The present invention preferably achieves this advantage by removing the need to unload the data from a column or table into an operating system file. This obviates the need to convert data from a database native format to an operating system native format, thereby saving the computational and time expense associated with these types of data conversion. This preferably reduces the total time taken to unload and reload data, which in turn preferably reduces the amount of time required for the database reorganization to complete.

Preferably, the at least one portion of the table is a column within a table of the database.

Preferably, the another location within the database is a temporary column defined within the table of the database. In that embodiment, preferably the step of storing the undefined data values comprises the steps of, declaring a column in the table of the database, and storing the unloaded data values in the declared column.

In some particular situations, it may be more efficient to unload data into a column within the same table in the database. Such efficiency considerations will be dependant on the particular database layout and features.

Preferably, the another location is a temporary column within another table in the database.

In other particular situations, it may be more efficient to unload data into a separate temporary table within the same database. Such efficiency considerations will be dependant on the particular database layout and features.

Preferably, the temporary column is a replica of the column within the database.

Preferably, the another location includes a key column within the temporary table in the database, wherein the key uniquely identifies the location of the data values within the table.

When transferring data to a separate table, it is preferable to have a methodology by which to relate values in the another column to the corresponding values in the column, so that data may be returned to the correct location in the column. This may be achieved by the use of a key, which may be any value which associates each element in the column to each element in the another column.

Preferably, the method comprises the further step of deleting the another table after the stored values are reloaded into the modified portion of the table.

In a second aspect, the present invention provides a system for modifying a database, comprising, means for unloading data values from at least a portion of a table in a database, means for storing the unloaded data values in a substantially original format in another location in the database;

means for modifying the at least one portion of the table, and reloading at least a portion of the stored data values to the at least one modified portion of the table.

In a third aspect, the present invention provides a computer program arranged, when loaded on a computing system, to implement a method in accordance with a first aspect of the invention.

In a fourth aspect, the present invention provides a computer readable medium providing a computer program in accordance with a third aspect of the invention.

DETAILED DESCRIPTION OF THE DRAWINGS

Features of the present invention will be presented in the description of any embodiment thereof, by way of example, with reference to the accompanying drawings, in which:

FIG. 1 illustrates a general purpose computer that may be used to implement the present invention.

DESCRIPTION OF THE PREFERRED EMBODIMENT

At FIG. 1 there is shown a schematic diagram of a computing system 10 suitable for use with an embodiment of the present invention. The computing system 10 may be used to execute applications and/or system services such as deployment services in accordance with an embodiment of the present invention. The computing system 10 preferably comprises a processor 12, read-only memory (ROM) 14, random access memory (RAM) 16, and input/output devices such as disk drives 18, keyboard 22, mouse 24, display 26, printer 28. The computer includes programs that may be stored in RAM 16, ROM 14, or disk drives 18 and may be executed by the processor 12. A communications link 20 connects to a computer network but could be connected to a telephone line, an antenna, a gateway or any other type of communications link. Disk drives 18 may include any suitable storage media, such as, for example, floppy disk drives, hard disk drives, CD ROM drives or magnetic tape drives. The computing system 10 may use a single disk drive 18 or multiple disk drives. The computing system 10 may use any suitable operating systems 30, such as Windows™ or Unix™.

The system further comprises a database 32. The database may be any appropriate database, such as relational database or a hierarchal database. An embodiment of the present invention may be supplied as a software module 34 arranged to interact with the database.

When the database structure is to be reorganized, the general procedure followed in the prior art is to unload the data contained in the database tables into an operating system file. The operating system file is a large file which holds the data in a rudimentary structure, such as in a comma delimited format. Once the appropriate reorganization operation is performed, the data is loaded from the operating system file into the new database table(s). There are two aspects of this scheme that make the unloading and loading of data computationally and time intensive. Firstly, if the quantity of data to be unloaded and loaded is large, the simple step of transferring the data from one location to another requires time. The second aspect of this prior art methodology that makes the unloading and loading of data computationally and time intensive is the necessity to convert the data from its native format in the database, to a more suitable format for an operating system file.

The need to change the format of the data arises from the particular type of data held in the database. A database can contain many different data types. Some data types hold text, other data types hold numbers (decimal or integer values), other data types hold binary values (eg. images). These data types may be of varying length, or of fixed length, or of practically unlimited length.

For example, a column that holds a person's name may be declared to have a varying length text data type with a maximum length of 50 characters. As another example, a column that holds a product code may be declared to have a fixed length text data type with a length of 5 characters. As a third example, a column that holds a detailed description of an employee's history with the company may be declared to have an unlimited length text data type (usually a limit exists, but for practical purposes the data type can be treated as having an unlimited length).

In addition to the parameters mentioned in the examples above, numeric data types generally allow the precision (number of significant digits) and scale (number of decimal places) to be declared.

Moreover, every data type must be capable of holding a "NULL" value that is not to be confused with any of the other valid value for the data type.

In other words, the variety and complexity of the data types that most databases can hold is vast. To be capable of handling all data types and their variations efficiently, the properties of the data type associated with each column are generally stored together with the other information about the column within the database.

For example, if a column is declared as a variable length text data type with a maximum length of 50 characters, allowing the NULL value, this information will also be recorded within the database.

However, as the column is defined as a variable length type, the actual value stored in the column may have a different length from the maximum length.

For example, the data for the column in the first row of the table may have a length of 10 characters, the value in the next row may have a length of 15 characters, the one in the third row may have a length of 7 characters, and the value in the fourth row may be a NULL value, thus not having any length.

To be capable of storing all of this information about the data types, the database has to format both the overall structure of a column within a table and the structure of the data values themselves must be formatted in a very specific manner that allows the data types to operate correctly, whilst allowing the database to work efficiently.

In other words, both correctness and performance are concerns for database operators. These requirements maybe met by any number of different methods, and each proprietary database generally incorporates a proprietary format which meets these requirements.

Therefore, a problem arises when unloading data from the database into an operating system file, since it is necessary to preserve all of the properties of the data so that the data can be correctly reloaded, and so that the data does not become indeterminate.

In the simplest case, where the database contains only text and numeric values, does not contain NULL values, and the text does not contain the comma (',') character, the data in the operating system file can be simply formatted as a comma-separated text file. This occurs in many commercial applications (e.g. Microsoft Excel allows data from a spreadsheet to be exported in a comma delimited format). A similar format that is used for data that contains commas but no tabs is the tab delimited text file. However, these formats are only useful for the simplest cases, and are generally not appropriate for enterprise system databases.

A particular problem arises with binary data, since binary data may contain any value that can be represented within a computer. For binary data, it is not possible to use commas or tabs to delimit the data because the values representing commas and tabs may actually form part of the data.

For fixed length binary data, there is no need for delimiters, as the length of the data is known. However, variable length data requires more complex solutions, such as "character stuffing". However, character stuffing is computationally intensive and time intensive, as it requires all of the data be scanned and modified on download, and again scanned and modified on reload.

Therefore, whilst there are prior art solutions which allow for the transfer of complex data structures, the solutions are costly in terms of time and computing resources. The prior art solutions do not address the problem of attempting to reduce the total system downtime during a database reorganization. In fact, the prior art solution generally increase the total downtime during a database reorganization. The applicant proposes a solution that ameliorates the need to convert data to and from the database's native data type.

The applicant proposes a method, which at least in a preferred embodiment, eliminates the need to convert data to and from the database's native format. The embodiment achieves this advantage by avoiding the need to unload the data to an operating system file. Rather, in the embodiment of the present invention, the data is unloaded to a similarly typed column within the same database. In other words, the unload and reload operations become simple copy operations between similarly typed columns within the database, and no data type conversion is necessary. This eliminates the computational cost of conversion from one format to another and reduces the time needed to perform the related database reorganization operations, thus reducing the amount of time the computing system is off-line due to a database reorganization.

Whilst different embodiments of the present invention may be arranged to operate with any type of database, or any environment supporting the persistence of data to operating system files, an example will hereinbelow be described with reference to a relational database, and the Enterprise Application Environment (EAE), which is a proprietary Unisys development application which can interact with a number of commercially available databases, such as Oracle and Microsoft SQL Server. In this simple example, it is assumed that the database is an SQL database (which is a particular type of proprietary database) and that the database is comprised of the table shown in Table I:

TABLE I

| Name | Address | Phone |
|---|---|---|
| John Doe | 5 International Way, Airportville | 9562-3847 |
| Jane Doe | 51 City Street, Metroville | 5248-0605 |
| James Smith | 89 Submarine Way, Marineopolis | 8977-2433 |

During the course of a database reorganization, it is found that the data in the Address column must be unloaded to correctly effect the database reorganization. In accordance with an embodiment of the present invention, the data is unloaded to another similarly typed column within the same database. There are two methods by which this process can be achieved. One method is to unload the data into another similarly typed column that resides within the same table as the original column. The other method is to unload the data into another similarly typed column in a different table to the table containing the original column, but still within the same database. Both solutions have relative advantages and disadvantages, depending on the particular implementation and structure of the database.

For example, the optimal method will vary depending on the type or quantity of data in the column, or it may vary depending on the particular database product being employed. The most optimal solution for any given situation will be decided on a case-by-case basis, by undertaking an investigation and performance measurement.

For the solution where the data is unloaded to another similarly typed column within the same table as the original column, first the similarly typed column called "TempAddress" is added to the table, as shown in Table II:

TABLE II

| Name | Address | Phone | Tempaddress |
|---|---|---|---|
| John Doe | 5 International Way, Airportville | 9562-3847 | |
| Jane Doe | 51 City Street, Metroville | 5248-0605 | |
| James Smith | 89 Submarine Way, Marineopolis | 8977-2433 | |

The data is then copied from the original Address column to the Tempaddress column. This is achieved by executing the following SQL command: "UPDATE TABLE SET TEMPADDRESS=ADDRESS"

The resultant table is shown in Table III:

TABLE III

| Name | Address | Phone | Tempaddress |
|---|---|---|---|
| John Doe | 5 International Way, Airportville | 9562-3847 | 5 International Way, Airportville |
| Jane Doe | 51 City Street, Metroville | 5248-0605 | 51 City Street, Metroville |
| James Smith | 89 Submarine Way, Marineopolis | 8977-2433 | 89 Submarine Way Marineopolis |

The Address column is cleared, as shown in Table IV:

TABLE IV

| Name | Address | Phone | Tempaddress |
|---|---|---|---|
| John Doe | | 9562-3847 | 5 International Way, Airportville |
| Jane Doe | | 5248-0605 | 51 City Street, Metroville |
| James Smith | | 8977-2433 | 89 Submarine Way, Marineopolis |

At this stage, the column in the database is reorganized as needed. After the reorganization is complete, the data is loaded back into the Address column as shown in Table V:

TABLE V

| Name | Address | Phone | Tempaddress |
|---|---|---|---|
| John Doe | 5 International Way, Airportville | 9562-3847 | 5 International Way, Airportville |
| Jane Doe | 51 City Street, Metroville | 5248-0605 | 51 City Street, Metroville |
| James Smith | 89 Submarine Way, Marineopolis | 8977-2433 | 89 Submarine Way, Marineopolis |

Lastly, the TempAddress column is deleted, as shown in Table VI thereby completing the reorganization of the Address column:

TABLE VI

| Name | Address | Phone |
|---|---|---|
| John Doe | 5 International Way, Airportville | 9562-3847 |
| Jane Doe | 51 City Street, Metroville | 5248-0605 |
| James Smith | 89 Submarine Way, Marineopolis | 8977-2433 |

The second solution in accordance with a second embodiment of the invention requires the creation of another table, containing a similarly typed column to the address column. However, because the column is within another table, there needs to be a way to relate the values in the column to the corresponding values in the original column.

In relational database terminology, what is needed is a key on which to associate the two tables. The key must be unique. In our example, the Name column can serve as a key as all of its entries are unique. Some database products support a ROWID pseudo-column providing a unique key on each table. That is, a ROWID pseudo-column is a column which assigns a unique value to each row in a table. For such database products, the ROWID column can be used as a key.

Once again, a simple example table, as shown in Table VII, is used to illustrate the second embodiment of the invention. An empty temporary table (Table VIII) is created to hold the data values temporarily. Table VIII contains two columns, one for the address, and one for the "key" (which in this example is the name column of the original table).

TABLE VII

| Name | Address | Phone |
|---|---|---|
| John Doe | 5 International Way, Airportville | 9562-3847 |
| Jane Doe | 51 City Street, Metroville | 5248-0605 |
| James Smith | 89 Submarine Way, Marineopolis | 8977-2433 |

TABLE VIII

| Name | Address |
|---|---|

The data values are unloaded from the Address column to the new table VIII. The related key values are also unloaded to Table VIII, to produce Table IX. Table VII remains unchanged at this step in the process.

TABLE IX

| Name | Address |
|---|---|
| John Doe | 5 Airport Way, Airportville |
| Jane Doe | 51 City Street, Metroville |
| James Smith | 89 Submarine Way, Marineopolis |

The Address column in the table VII is cleared, to produce the table shown in table X:

TABLE X

| Name | Address | Phone |
|---|---|---|
| John Doe | | 9562-3847 |
| Jane Doe | | 5248-0605 |
| James Smith | | 8977-2433 |

At this point, the address column is reorganized. After the reorganization is complete, the data is loaded back into the Address column, loading the values in the address column into the rows that contain matching values in the related key columns, to produce the table shown in Table XI:

TABLE XI

| Name | Address | Phone |
|---|---|---|
| John Doe | 5 International Way, Airportville | 9562-3847 |
| Jane Doe | 51 City Street, Metroville | 5248-0605 |
| James Smith | 89 Submarine Way, Marineopolis | 8977-2433 |

Lastly, the temporary table is deleted, which completes the reorganization of the Address column.

Therefore, in at least a preferred embodiment, the present invention allows data to be unloaded and reloaded from a column within a table without the use of an operating system file. In turn, this ameliorates the need to convert data from the native database format to the native operating system format.

Therefore, the embodiments of the present invention hereinbefore described preferably reduce the amount of "downtime" during a database reorganization.

Whilst the aforementioned example and specific embodiments are directed to a database application, the present invention may also be applied to programming environments that allow for the serialization and archiving of data. For example, the Java programming language allows for objects to be serialized (i.e. converted to a format that is suitable for storage in an operating system file).

Serialization is a computationally intensive operation, as it requires the data within the Java object to be converted from the proprietary Java format into a format that is suitable for storage in an operating system file. Certain C++ class libraries also cater for a similar operation, generally referred to as object persistence or archiving. In all these cases, there is a cost associated with the conversion of the data from its native format to a format suitable for storage in an operating system file. In at least a preferred embodiment, the present invention reduces the computational cost associated with a serialization operation by using other similarly typed structures within the same environment as the original structures, rather than undergoing the expensive conversion necessary to store the data within an operating system file.

The invention claimed is:

1. A computer-implemented method of modifying a database, comprising the steps of:

(a) unloading data values from at least one portion of an original table in a database;

(b) storing said unloaded data values in substantially original format into another table located in said database;

(c) modifying the at least one portion of said original table to form a modified portion;

(d) reloading at least a portion of the stored data values into the at least one modified portion of the said original table;

(e) deleting said another table after the stored data values are reloaded into the modified portion of said original table; wherein the at least one portion of said original table is an original column within said table of said database, and another location is a temporary column within another table in said database, wherein said another location includes a key column within said temporary column in said database, wherein said key uniquely identifies location of data values within another table.

2. A method in accordance with claim 1, which includes the step of setting another location within said database as a temporary column defined within said original table of said database.

3. A method in accordance with claim 1, which includes the step of making said temporary column as a replica of the column within said database.

4. A computer program arranged, when loaded on a computing system, to implement a method in accordance with claim 1.

5. A computer readable medium providing a computer program in accordance with claim 4.

6. A computer-implemented system for modifying a database, comprising, (a) means for unloading data values from at least a portion of an original table in said database;

(b) means for storing the unloaded data values in a substantially original format into another table located in said database;

(c) means for modifying the at least one portion of said original table;

(d) means for reloading at least a portion of the stored unloaded data values to the at least one modified portion of said original table;

(e) means for deleting said another table after said stored data values are reloaded into said modified one portion of said original table; wherein the at least one portion of said original table is a temporary column within said table of said database, and another location is a temporary column within another table in said database, wherein said another location in said database includes a key column within a temporary table in said database, wherein said key uniquely identifies location of data values within said table.

7. A system in accordance with claim 6, wherein the another location within the database is a temporary column defined within the table of the database.

8. A system in accordance with claim 7, wherein said temporary column is a replica of the column within the original database.

* * * * *